United States Patent Office 3,351,652
Patented Nov. 7, 1967

3,351,652
QUATERNARY AMMONIUM COMPOUNDS
Reginald L. Wakeman, Philadelphia, Pa., and Joseph F. Coates, Washington, D.C., assignors, by mesne assignments, to Millmaster Onyx Corporation, New York, N.Y., a corporation of New York
No Drawing. Filed Oct. 28, 1963, Ser. No. 319,530
5 Claims. (Cl. 260—473)

The object of the present invention is the preparation of relatively water-insoluble, microbiologically active compounds by reaction of water-soluble, bacteriologically active, non-heterocyclic quaternary ammonium compounds possessing a single long alkyl radical containing from eight to eighteen carbon atoms with water-soluble phenolic compounds containing only carbon, hydrogen and oxygen and free from carboxylic acid groups.

The quaternary ammonium compounds may be in the form of either hydroxides or their water-soluble salts, preferably salts of inorganic acids. The phenolic compounds may be in the form of either free phenols or their water-soluble salts such, for example, as their alkali metal, i.e., sodium or potassium, salts.

Typical examples of these quaternary ammonium compounds are alkyl trimethyl ammonium chloride, alkyl benzyl trimethyl ammonium chloride and alkyl dimethyl benzyl ammonium chloride in which the alkyl group may have from eight to twenty-two carbon atoms; alkyl phenoxy ethoxy ethyl dimethyl benzyl ammonium chloride in which the alkyl radical may be isooctyl or nonyl; alkyl dimethyl substituted benzyl ammonium chlorides in which the alkyl radical contains from eight to twenty-two carbon atoms and in which the benzyl radical is substituted with one or more side chains containing from one to four carbon atoms such, for example, as methyl, dimethyl, trimethyl, tetramethyl, ethyl, diethyl, isopropyl and tertiary butyl; and alkyl dimethyl menaphthyl ammonium chloride in which the alkyl radical contains from eight to twenty-two carbon atoms and mixtures of the aforesaid quaternary ammonium compounds.

As suitable phenols, we may employ any monohydric or polyhydric phenol containing only carbon, hydrogen and oxygen which is free from carboxyl groups. Examples of such phenols are phenol itself; the isomeric cresols; xylenols; catechols; catechol ethers; resorcinols and alkylated resorcinols, such as hexyl resorcinol and phlorglucinol; isopropyl phenols; t-butyl phenols; 4-methyl-6-t-butyl phenol; di-t-butyl phenol; di-t-butyl-p-cresol; higher alkyl phenols such, for example, as octyl, nonyl and dodecyl phenol, o-phenyl phenol, p-phenyl phenol, 2,2'-methylene-bis-4-ethyl-6-t-butyl phenol; derivatives of the foregoing compounds free from carboxylic acid groups; salicylaldehyde; esters of phenolic acids such as p-hydroxy methyl benzoate, p-hydroxy ethyl benzoate, p-hydroxy butyl benzoate, p-hydroxy benzyl benzoate which may also be designated at p-carboalkoxy alkyl phenols; hydroxy diphenyl; hydroxy diphenyl oxide and the like.

The phenols are preferably reacted in the form of their water-soluble salts such as their sodium, potassium or ammonium salts or in the form of the free phenol if solubility relationships permit.

The compounds can be prepared by mixing an aqueous solution of the phenolic salt with an aqueous solution of a quaternary ammonium salt having bacteriologically active properties. The two solutions are thoroughly mixed and then are allowed to stand until they separate into two distinct layers. The upper layer will normally contain the compound of the present invention. Layer separation is conveniently effected by conducting the reaction in a separatory funnel and drawing off the desired layer. The product usually contains some water which can be removed by distillation or drying in a vacuum oven. The aqueous product layer can, however, be used directly in any process where the entrapped water would not be harmful.

It is surprising that the compounds of this invention exhibit high germicidal activity despite their relative insolubility in water. Because of this unusual combination of physical and microbiological properties, they can be used to impart laundry-resistant antimicrobial characteristics to textiles. They can also be used as the active agent in antimildew finishes for textiles which are resistant to leaching with water.

Although the compounds are water-insoluble, they are compatible with various organic solvents, plasticizers and high molecular weight compounds. Consequently, they may be incorporated as antimicrobial agents in synthetic resins and plastic. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents.

It will be understood that the properties of the products described herein will vary to some extent, depending upon the nature of the quaternary ammonium compound used in their preparation.

The chemical, physical and biological properties of the products of our invention make them especially appropriate for the following applications when accompanied by the appropriate vehicle, binders, medium or substrate:

(1) Mildewproofing fabric, canvas, ropes, textiles, awnings, sails, tenting and other woven and non-woven reticulated materials.
(2) Paint mildewstats.
(3) Jet plane fuel additive to control growth of microorganisms.
(4) Odor preservative agents for clothes and shoes.
(5) Mildew retardant and odor suppressant for shoes and other leather products.
(6) Topical antiseptics.
(7) Anti-dandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application of film, waxes and cloth to preserve cheese, meats, vegetables and other food products.

(18) Algeal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.

The biological activity of our compounds was evaluated for biological stasis by the Standard Tube Dilution Test, the technique for which is common knowledge to those skilled in the art. A Difco Bacto CSMA Broth #0826 was used in the study. This test is used to determine the lowest concentration of biologically active compounds which will inhibit the growth of the organism in question. For a wide range of application, the inhibition of growth rather than outright kill is satisfactory.

Briefly put, the Tube Dilution Test consists in putting 9 cc. of the CSMA Broth in a test tube which is then sterilized in an autoclave. One cc. solution of the biologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. They are, however, incubated for fourteen days at a temperature suitable for optimum growth.

The invention is illustrated by, but not restricted to, the following examples:

EXAMPLE I

One hundred grams of a solution containing 8 weight percent of the sodium salt of phenol was prepared. Three hundred and twenty grams of a 10 weight percent solution of alkyl dimethyl ethyl benzyl ammonium chloride (BTC–471, Onxy Chemical Corporation; alkyl distribution $C_{12}$ 50%, $C_{14}$ 30%, $C_{16}$ 17%, $C_{18}$ 3%) was added to the phenol solution and the solutions well mixed and poured into a 1 liter separatory funnel. The product layer was separated and dried in a vacuum oven to give 35 grams (91% yield) of a brown paste.

EXAMPLE II

Using the general method of Example I, the following derivatives of p-hydroxy benzoic esters were prepared to give the products in yields and physical form shown:

| Quaternary Ammonium Compound Used | Phenolic Compound | Yield of Product, Percent | Physical Form |
|---|---|---|---|
| Alkyl dimethyl ethyl benzyl ammonium chloride (from Ex. I). | p-Hydroxy methyl benzoate. | 97 | Yellow paste |
| Do | p-Hydroxy ethyl benzoate. | 92 | Do. |
| Do | p-Hydroxy propyl benzoate. | 84 | Brown oil. |
| Do | p-Hydroxy butyl benzoate. | 97 | Yellow paste. |
| Do | p-Hydroxy benzyl benzoate. | 52 | Brown oil. |
| Alkyl dimethyl benzyl ammonium chloride (see Ex. IV). | p-Hydroxy methyl benzoate. | 100 | Yellow paste. |
| Do | p-Hydroxy ethyl benzoate. | 94 | Do. |
| Do | p-Hydroxy propyl benzoate. | 91 | Brown oil. |
| Do | p-Hydroxy butyl benzoate. | 97 | Yellow paste. |
| Do | p-Hydroxy benzyl benzoate. | 93 | Brown oil. |

EXAMPLE III

The products from Examples I and II were tested in the Standard Tube Dilution Test described above against *Staphylococcus aureus* (*S. a.*), *Salmonella typhosa* (*S. t.*) and *Aspergillus niger* (*A. n.*). Results of these tests are shown in Table I.

TABLE I

| | Reciprocal Of Static Dilution of Product vs.— | | |
|---|---|---|---|
| | S. a. | S. t. | A. n. |
| Alkyl Dimethyl Ethyl Benzyl Ammonium Chloride Reaction Product With— | | | |
| Phenol | $10^6$ | $10^5$ | $10^5$ |
| p-Hydroxy methyl benzoate | $10^6$ | $10^5$ | $10^3$ |
| p-Hydroxy ethyl benzoate | $10^7$ | $10^6$ | $10^5$ |
| p-Hydroxy propyl benzoate | $10^7$ | $10^6$ | $10^4$ |
| p-Hydroxy butyl benzoate | $10^5$ | $10^5$ | $10^4$ |
| p-Hydroxy benzyl benzoate | $10^6$ | $10^4$ | $10^5$ |
| Alkyl Dimethyl Benzyl Ammonium Chloride Reaction Product With— | | | |
| p-Hydroxy methyl benzoate | $10^6$ | $10^5$ | $10^5$ |
| p-Hydroxy ethyl benzoate | $10^8$ | $10^6$ | $10^3$ |
| p-Hydroxy propyl benzoate | $10^6$ | $10^6$ | $10^5$ |
| p-Hydroxy butyl benzoate | $10^5$ | $10^5$ | $10^4$ |
| p-Hydroxy benzyl benzoate | $10^6$ | $10^5$ | $10^4$ |

EXAMPLE IV

In an 80 gallon stainless steel kettle was placed 125 lbs. of water and 22.6 lbs. of 30% NaOH solution added. Thirty-seven lbs. of nonyl phenol and 24 lbs. of isopropanol were then added. When, after stirring, a clear solution was obtained, 128 lbs. of a 50 weight percent solution of alkyl dimethyl benzyl ammonium chloride (BTC-824, Onyx Chemical Corporation, in which the alkyl distribution is 60% $C_{14}$, 30% $C_{16}$, 5% $C_{12}$, 5% $C_{18}$) was added. Stirring was continued one-half hour and then layer separation allowed to occur. The product (top) layer was vacuum dried to give 105 lbs. of a red-brown viscous liquid.

EXAMPLE V

In a 2 liter separatory funnel were placed 400 grams of a 10% (by weight) solution of the sodium salt of o-phenyl phenol and 790 grams of a 10% solution of alkyl dimethyl benzyl ammonium chloride (identical to that used in Example IV). The funnel was shaken, 50 grams of benzene added and then allowed to stand to permit layer separation. The benzene layer was heated first on a steam bath and then in a vacuum oven to given 104 grams (97% yield) of a brown syrup. The corresponding p-phenyl phenol reaction product was obtained in a similar way.

EXAMPLE VI

In a 2 liter separatory funnel were placed 400 grams of a 10% (by weight) solution of the sodium salt of p-phenyl phenol and 550 grams of a 10% solution of alkyl dimethyl ethyl benzyl ammonium chloride. The solutions were well mixed by shaking the funnel and 50 grams of benzene added to facilitate layer separation. The benzene layer was heated on a steam bath to evaporate the benzene and then dried in a vacuum oven to give 74 grams (96% yield) of a pink solid. In a similar way the o-phenyl phenol reaction product with this quaternary ammonium compound was obtained.

EXAMPLE VII

Using the general method of Examples V and VI, a number of additional phenolic derivatives were prepared. These are shown below with their yields and physical form indicated.

| Quaternary Ammonium Compound Used | Phenolic Compound | Yield of Product, Percent | Physical Form |
|---|---|---|---|
| Alkyl dimethyl ethyl benzyl ammonium chloride (from Ex. I). | p-Cresol | 98 | Yellow paste. |
| Do | Mixed t-butyl phenols. | 100 | Dark green paste. |
| Do | 4-methyl-6-butyl phenol. | 98 | Purple paste. |
| Do | 2,2'-methylene-bis-4-ethyl-6-t-butyl phenol. | 97 | Green paste. |
| Do | Salicylaldehyde | 94 | Dark green paste. |
| Alkyl dimethyl benzyl ammonium chloride (from Ex. IV). | Mixed t-butyl phenols. | 87 | Do. |
| Do | 4-methyl-6-t-butyl phenol. | 87 | Purple paste. |
| Do | 2,2'-methylene-bis-4-ethyl-6-t-butyl phenol. | 77 | Green paste. |
| Do | Salicylaldehyde | 95 | Dark green paste. |

EXAMPLE VIII

The products from Examples IV–VII were tested in the Standard Tube Dilution Test described above against *Staphylococcus aureus* (S. a.), *Salmonella typhosa* (S. t.) and *Aspergillus niger* (A. n.). Results of these tests are shown in Table II.

TABLE II

|  | Reciprocal Of Static Dilution of Product vs.— | | |
|---|---|---|---|
|  | S. a. | S. t. | A. n. |
| Alkyl Dimethyl Ethyl Benzyl Ammonium Chloride Reaction Product With— | | | |
| Nonyl phenol | $10^6$ | $10^5$ | $10^4$ |
| o-Phenyl phenol | $10^5$ | $10^5$ | $10^4$ |
| p-Phenyl phenol | $10^5$ | $10^4$ | $10^4$ |
| p-Cresol | $10^6$ | $10^5$ | $10^5$ |
| Mixed t-butyl phenols | $10^6$ | $10^5$ | $10^3$ |
| 4-methyl-6-t-butyl phenol | $10^6$ | $10^5$ | $10^5$ |
| 2,2'-methylene-bis-4-ethyl-6-t-butyl phenol | $10^6$ | $10^5$ | $10^3$ |
| Salicylaldehyde | $10^6$ | $10^5$ | $10^5$ |
| Alkyl Dimethyl Benzyl Ammonium Chloride Reaction Product With— | | | |
| Nonyl phenol | $10^6$ | $10^5$ | $10^4$ |
| o-Phenyl phenol | $10^5$ | $10^5$ | $10^5$ |
| p-Phenyl phenol | $10^5$ | $10^6$ | $10^4$ |
| Mixed t-butyl phenols | $10^6$ | $10^5$ | $10^5$ |
| 2,2'-methylene-bis-4-ethyl-6-t-butyl phenol | $10^5$ | $10^5$ | $10^5$ |

EXAMPLE IX

The product from Example IV was dissolved 25% by weight in butyl "Cellosolve" and this solution added to latex paint (free of any other bactericide) at a rate of 4 ounces per gallon. This paint was then used to cover 2" x 2" squares of filter paper. The coated filter paper was inoculated with *Pullularia pullulans* and maintained at 90% relative humidity and 28° C. for thirty days. At the end of this period no growth was visible on the swatches. In addition, a 4-ounce sample of the treated paint was inoculated with 1 cc. of spoiled paint containing a mixture of organisms. After one week at room temperature no growth was observed.

Many of the products of this invention shown molluscicidal activity (20% to 100% mortality) at levels varying from 10 to 1000 parts per million when screened by standard plate and immersion tests against the amphibious snail, *Oncomelania nosophora*, the snail vector for *Schistosma japonicum*. In addition, these compounds exhibit a narcotizing effect on the amphibians.

We claim.

1. A compound formed by the reaction of (1) a water-soluble bacteriologically active quaternary ammonium compound having as N-substituents a member of the group consisting of alkyl, alkylebnzyl and alkylpehnoxyethoxyethyl wherein the alkyl, in each instance, has 8 to 22 carbon atoms, two methyl groups, and a member selected from the group consisting of methyl, benzyl, menaphthyl and substituted benzyl wherein the substituents consist of from one to four alkyls containing from 1 to 4 carbon atoms; and (2) a phenolic compound containing only carbon, hydrogen and oxygen and having as acidic groups only at least one phenolic hydroxy group.

2. A compound as defined in claim 1 wherein the N-substituents are alkyl benzyl in which said alkyl has from 8 to 22 carbons and three methyl groups.

3. A compound as defined in claim 1 wherein the N-substituents consist of alkylpenoxyethoxyethyl in which alkyl is selected from the group of isoctyl and nonyl, two methyl groups and a benzyl group.

4. A compound as defined in claim 1 wherein the N-substituents are an alkyl of from 8 to 22 carbons and three methyl groups.

5. A compound as in claim 1 wherein the phenolic compound is selected from the group consisting of phenol; xylenols; catechols; catechol ethers; cresols; resorcinols; alkylated resorcinols; isopropyl phenols; t-butyl phenols; 4-methyl-6-t-butyl phenol; di-t-butyl phenol; di-t-butyl-p-cresol; higher alkyl phenols, o-phenyl phenol, p-phenyl penol, 2,2'-methylene-bis-4-ethyl-6-t-butyl phenol; p-carbo alkoxy and benzoxy alkyl phenols; salicylaldehyde; hydroxy diphenyl; and hydroxy diphenyl oxide.

References Cited

Setkina et al., "Exchange and Cleavage Reactions of Quaternary Ammonium Salt," Chemical Abstract, vol. 46 (1952), pp. 458–9.

LORRAINE A. WEINBERGER, *Primary Examiner.*

S. WILLIAMS, D. STENZEL, *Assistant Examiners.*